United States Patent
Brown

[15] 3,680,474
[45] Aug. 1, 1972

[54] TACO SHELL COOKING MACHINE
[72] Inventor: Robert E. Brown, Pasadena, Calif.
[73] Assignee: F & M Taco Shell Company, Los Angeles, Calif.
[22] Filed: March 28, 1969
[21] Appl. No.: 811,540

[52] U.S. Cl. .........................99/353, 99/404, 99/427
[51] Int. Cl. ..............................................A47j 37/12
[58] Field of Search........99/352, 427, 407, 406, 405, 99/404, 353, 443

[56] References Cited

UNITED STATES PATENTS

| | | | |
|---|---|---|---|
| 3,570,393 | 3/1971 | Schy | 99/404 |
| 3,576,647 | 4/1971 | Liepa | 99/100 |
| 2,112,309 | 3/1938 | Santillan | 99/404 X |
| 2,512,591 | 6/1950 | Alexander | 99/353 UX |
| 2,570,374 | 10/1951 | Pompa | 99/427 UX |
| 2,907,268 | 10/1959 | Doolin | 99/404 X |
| 2,967,474 | 1/1961 | Ford | 99/427 X |
| 3,267,836 | 8/1966 | Yepis | 99/427 X |
| 3,520,248 | 7/1970 | MacKendrick | 99/404 X |

Primary Examiner—Walter A. Scheel
Assistant Examiner—Alan I. Cantor
Attorney—Herzig & Walsh

[57] ABSTRACT

The machine is constructed to automatically dry partly cooked tacos or tortillas before being formed and then to automatically form them while completing cooking in a vat or tank of cooking oil. The dried tortillas are carried by a conveyor to the cooking and forming mechanism. This mechanism comprises two sets of conveyors that form the tortillas into the taco shape and carry them down through the cooking oil after which they are released and allowed to float to the surface after which the formed and cooked tacos are carried away. One conveyor is arranged over the other, each conveyor carries a series of V-shaped forming members arranged so that the forming members on the lower conveyor telescope into the forming members on the upper conveyor as they are passed through the cooking oil. The tortillas are carried into a position between the upper and lower forming members and are then formed as the upper members telescope down over the lower members.

5 Claims, 6 Drawing Figures

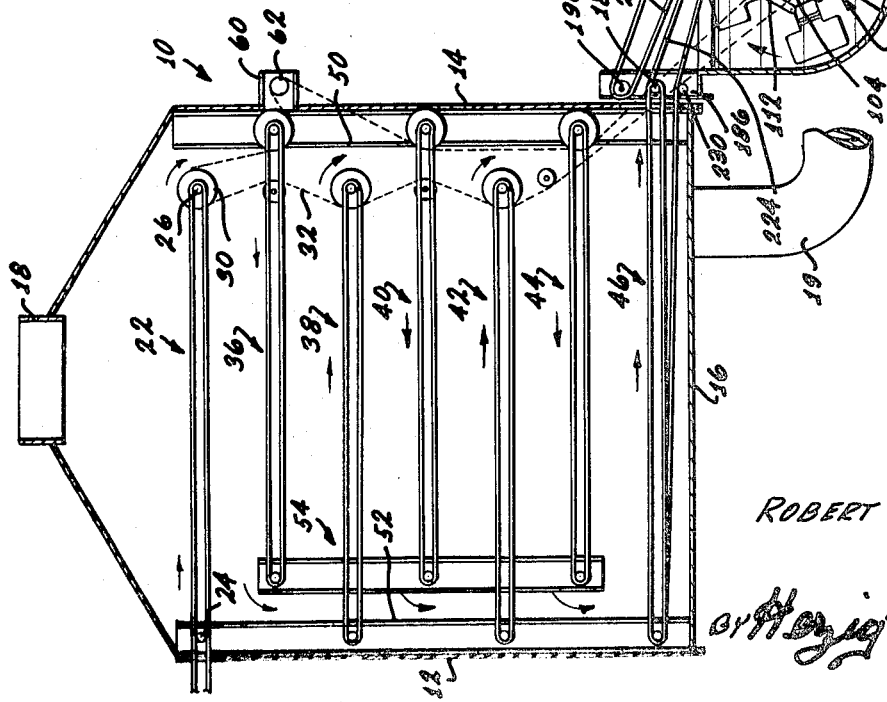

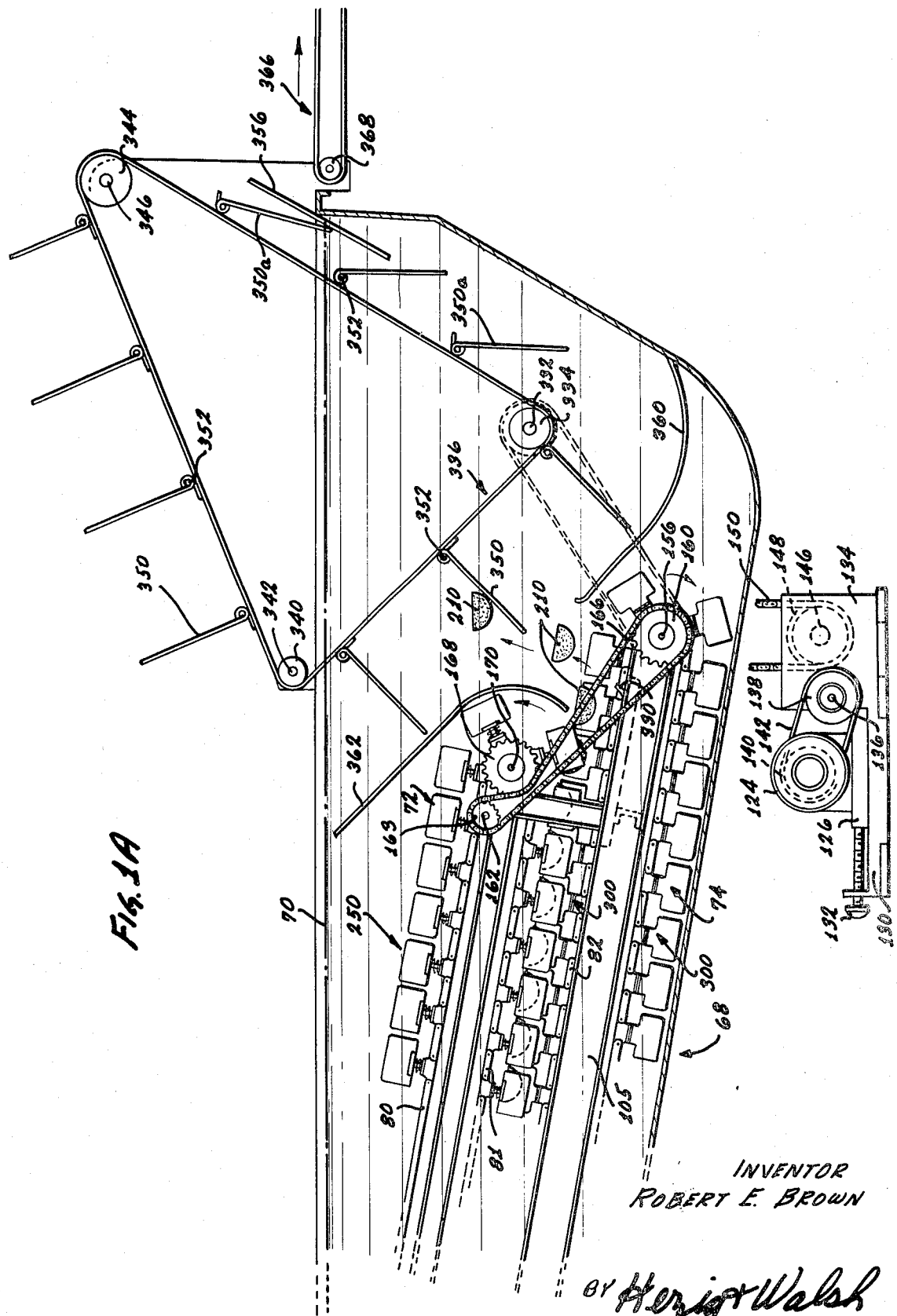

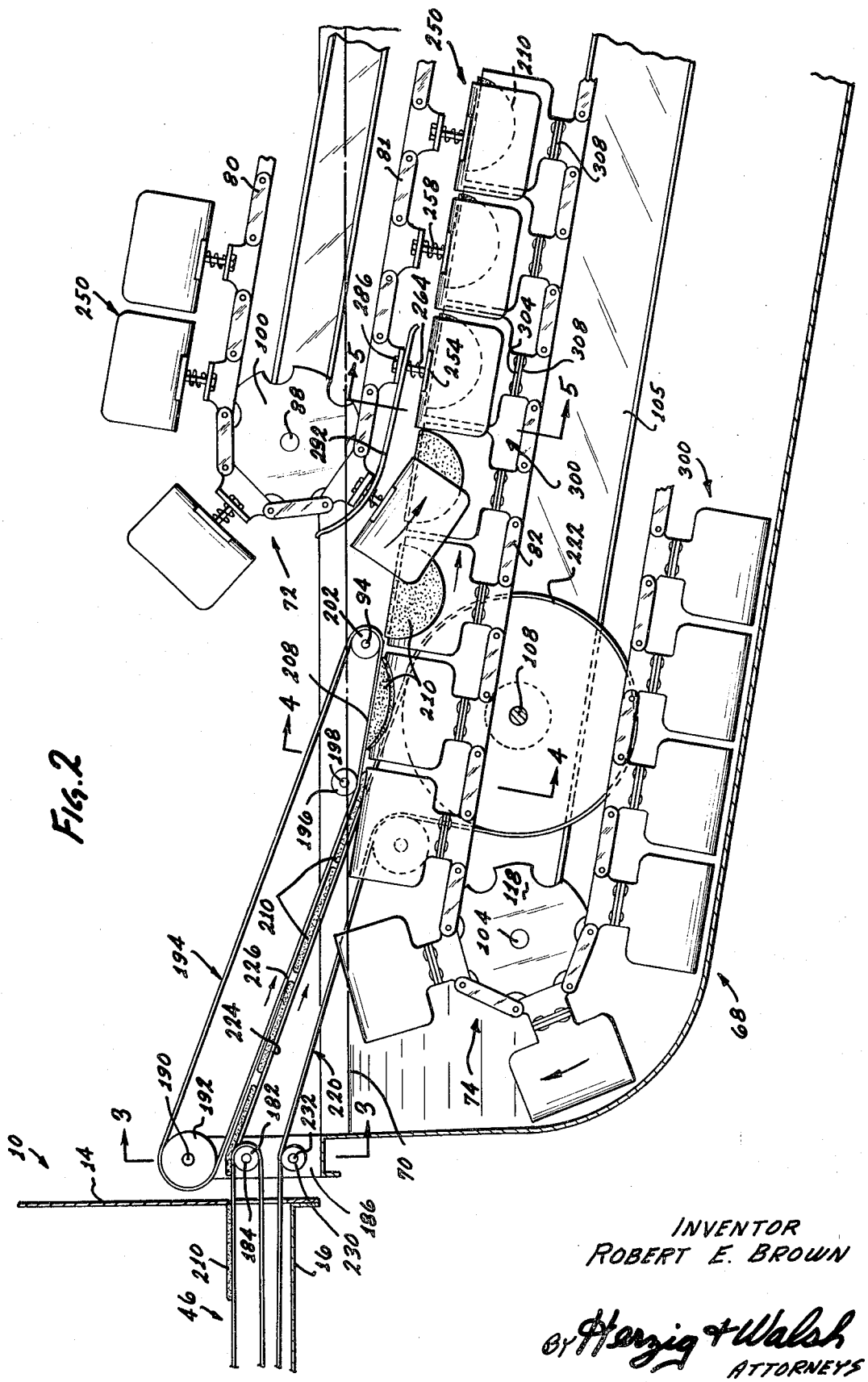

INVENTOR
ROBERT E. BROWN
BY Herzig + Walsh
ATTORNEYS

TACO SHELL COOKING MACHINE

SUMMARY OF THE INVENTION

The invention relates to a taco cooker and forming machine by means of which tacos can be completely cooked and formed automatically. As is well known, tacos are a cooked product that are initially round and are then formed by being folded along a diameter to form a V-shape and are further cooked while in this shape. Food products are then placed in the taco in the fold thereof. Machines have been known in the past for preparing and cooking tacos or taco shells but they have been subject to substantial deficiencies. Typically it has been necessary to feed the tortillas to a machine by hand. Also such machines have been of such a nature that the tacos could not be handled rapidly enough to be of significance. Furthermore, a machine of this type cannot be considered successful if the machine is too complicated, thus raising problems of initial cost, repair, upkeep and maintenance, especially as respects sanitary requirements.

The machine of the herein invention overcomes the deficiencies of the prior art and embodies all the necessary characteristics to be eminently successful for its purpose. In a preferred form of the machine, an exemplary embodiment of which is described in detail herein, it is combined with a drying unit whereby the partially cooked tortillas are dried and then automatically fed to the forming apparatus. The forming apparatus is of unique construction whereby with relatively simple but extremely effective mechanism the tacos are automatically formed and carried through the cooking oil for cooking. Two conveyors are provided to carry the formed tacos down into and through a vat or tank of cooking oil after which the formed tacos are released. The upper conveyor has a reach or length of conveyor chain that moves over a reach or length of conveyor chain of the lower conveyor. The said length of conveyor chain on the upper conveyor carries forming members which are of inverted V-shape. The said reach or length of the lower conveyor carries similar V-shaped forming members which are inverted and the forming members on the two conveyors being so spaced that they come together and telescope one within another. The tortillas are fed at one end to a position between upper and lower forming members that are about to telescope so that they are formed between the forming members and thus held formed while carried through the cooking oil to be cooked after which they are released.

From the foregoing the general nature of the invention will be understood and its objects will be appreciated. The primary object is to make possible the effective cooking and forming of tortillas automatically without hand feeding in a relatively simple apparatus.

Another object is to make available a fully automatic taco forming and cooking machine including means for drying tacos before forming and cooking and for automatic feeding of the machine.

Another object is to provide a machine of the type referred to wherein the forming of the tacos is achieved by way of conveyor means carrying a first and second series of forming members which are of V-shape and which telescope with respect to each other to form the tacos which are then carried through the cooking oil while held by the forming members.

Further objects and additional advantage of the invention will become apparent from the following detailed description and annexed drawings wherein:

FIG. 1 is a sectional view of an end part of a preferred form of machine;

FIG. 1A is a view similar to that of FIG. 1 showing the other end part of the machine;

FIG. 2 is an enlarged side view of the feed end of the machine;

Figure 3:
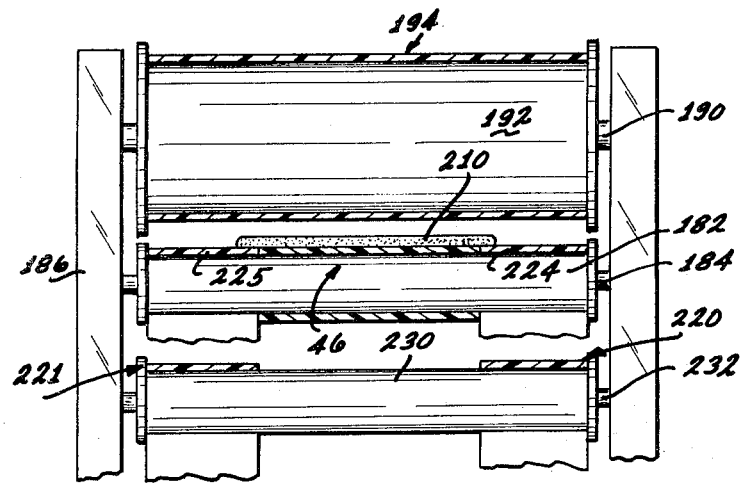
FIG. 3 is a sectional view taken along line 3—3 of FIG. 2.

Referring now to FIG. 1 of the drawings, numeral 10 designates a dryer for drying the partially cooked taco shells or tortillas before they are formed or folded by the forming mechanism. The unit 10 is rectangular in cross-section having sidewalls as shown at 12 and 14 and a bottom 16. It is tapered at the upper part as shown having a stack 18. Air is circulated through the housing for drying, by conventional circulating means.

The oven 10 is sealed except for the entrance and exit. Preferably a vacuum is drawn through the conduit 19 and heated air is drawn in through the top. The tortillas must be partially dehydrated before being plunged into the hot cooking oil. In the past the tortillas have been placed in a refrigerator for six to seven hours after being partially baked. This dries them sufficiently so that they can be plunged into hot oil without "soufleing" that is puffing up with air bubbles. The unit 10 is constructed to dehydrate the tortilla in a matter of one minute or less.

Provided within the housing is a series of overlying conveyors as shown. The top conveyor is designated at 22 being in the form of a flat belt operating over transverse rollers such as shown at 24 and 26. The axles of the rollers are suitably journaled in the housing. The unformed tortillas or tacos are carried into the housing on the conveyor 22. The shaft of roller 26 has on it a sprocket wheel 30 which is driven by a chain as illustrated at 32.

Below the conveyor 22 is a second conveyor 36 which is similar except that its left end is spaced inwardly from the sidewall of the housing 10. As may be seen, the right end of conveyor 22 is spaced inwardly from the sidewall 14 of the housing 10. Tortillas carried inwardly on the conveyor 22 drop off its right end onto the conveyor 36 and they are then carried to the left after which they drop off the end of that conveyor. Below the conveyors 22 and 36 are further conveyors 38, 40, 42, 44 and 46 which are similar, these conveyors being similarly oriented so that the tacos will be carried to the right on conveyor 38 after which they will drop off into the conveyor 40. On the conveyor 40 they are carried to the left and they drop off onto the conveyor 42 to be carried to the right. They drop off this conveyor onto the conveyor 44 to finally be carried to the right on conveyor 46 to be automatically fed to the forming and cooking apparatus. At each end of the various conveyors they operate over rollers like rollers 24 and 36 as previously described. The roller shafts at the right ends of the conveyors are provided with sprocket wheels like the sprocket wheel 30 previously described and all of these sprocket wheels being driven by the same chain 32 as previously described.

Spaced inwardly from the wall 14 is an inner wall 50 and spaced inwardly from the wall 12 is an inner wall 52, rollers at the ends of alternate conveyors being positioned between the spaced walls. The numeral 54 designates an upright double wall structure within which are mounted the shafts for the rollers at the left ends of conveyors 36, 40 and 44. Extending to the right from the sidewall 14 is a support frame 60 in which is journaled a shaft having on it an idler sprocket 62 over which the chain 32 passes in order for this chain to appropriately engage sprocket wheels at the ends of conveyors 36 and 40. The drive of chain 32 will be described presently.

The flat tacos or tortillas are fed from the drying unit 10 by the conveyor 46 between two conveyor belts which then deliver the tacos into the forming and cooking apparatus. This structure is shown more in detail in FIG. 2 and will be described presently.

FIGS. 1 and 1A show the complete cooking and forming machine. It comprises a tank or vat of suitable cooking oil as designated at 68 having in it cooking oil to a level as designated at 70 in these two figures. Numeral 72 designates generally an upper conveyor and numeral 74 designates generally a lower conveyor as will be observed, the left ends of these conveyors being at a higher level in the tank 68 than the right ends. The upper reach or length of the upper conveyor is designated at 80 and the upper reach of the lower conveyor is designated at 82. The lower reach of the upper conveyor is designated at 81. It will be observed that these two reaches or lengths overlie each other in spaced relationship and they move in the same direction. The conveyors preferably are formed of link chain and are driven by sprocket wheels. Numeral 88 designates a transverse shaft the ends of which are suitably journaled in frame members forming part of the apparatus such as shown at 89 and on this shaft is the sprocket wheel 90. Numeral 92 designates a second sprocket wheel on a shaft 94 similarly mounted in the structure and passing over the sprocket wheels 90 and 92 is a sprocket chain 96. On the shaft 88 is sprocket wheel 100 and the upper conveyor chain 72 passes over this sprocket wheel. (The structure of the conveyors and forming members is shown in more detail in FIG. 2.) Referring to FIG. 1, numeral 104 designates a transverse shaft journaled in frame members such as the member 105 and on this shaft is a sprocket wheel 106. Numeral 108 designates a similar transverse shaft on which is a sprocket wheel 110 and passing over the sprocket wheels 106 and 108 is a sprocket chain 112 which will be referred to again presently. On the shaft 104 there is also a sprocket wheel 118 which is similar to the sprocket wheel 100. The lower conveyor chain 74 passes over the sprocket wheel 118 as may be seen in FIGS. 1 and 2. The drive means for all the conveyors including the conveyors of the drying unit 10 will be described presently.

Referring now to FIG. 1A as previously pointed out, the tank 68 is deeper at the right end, the conveyors extending at an angle towards this deeper end. The chain conveyors 72 and 74 are driven from the right end. Numeral 124 designates a driving motor which may be an electric motor having a base 126 mounted on a platform 130. The base 126 may be adjusted by an adjusting screw 132. Numeral 134 designates housing for a reduction gear train and this gear train includes a shaft 136 having on it a pulley 138 and passing over this pulley and a similar pulley 140 driven by the motor 124 is a drive belt 142. The gear unit 134 has an output shaft 146 on which is a sprocket wheel 148 which drives sprocket chain 150.

Numeral 156 designates a transverse shaft the ends of which are suitably journaled in frame members of the machine. On this shaft is a sprocket wheel which is driven by the sprocket chain 150. And also on this shaft is a sprocket wheel like the sprocket wheel 118 over which passes the lower conveyor chain 74.

On the shaft 156 is a sprocket wheel 160. Numeral 162 designates another transverse shaft, the ends of which are suitably journaled in frame members of the apparatus and on this shaft is a sprocket wheel 163. Numeral 166 designates a sprocket chain which passes over the sprocket wheels 160 and 163, the sprocket wheel 163 being an idler sprocket, the chain 166 engaging with another sprocket wheel 168 mounted on a transverse shaft 170 suitably journaled in bearings in frame members of the apparatus. On the shaft 170 is another sprocket wheel like the sprocket wheel 100 and over which passes the upper conveyor chain. It will be observed that the upper and lower forming conveyors are driven from the right end. Next will be described the feeding and forming mechanism.

FEEDING AND FORMING MECHANISM

The feeding and forming mechanism is best shown in FIGS. 2, 3, 4 and 5, although the drive of the feeding conveyors is shown in FIG. 1.

As may be seen in FIG. 2, the conveyor 46 passes over a roller 182 on a shaft 184 supported in frame structure 186 outside of the drying unit 10 which has an opening as shown through which the conveyor 46 extends. The frame structure 186 also supports another shaft 190 having on it a roller 192 over which passes a conveyor belt 194. The conveyor belt 194 passes under a roller 196 on a shaft 198 suitably journalled in the frame structure. It passes around a further roller 202 on a shaft 94 suitably journalled in the frame structure. It may be seen that between the rollers 196 and 202 there is a straight section 208 of the belt 194 which lies in a position parallel to parts of the forming members that are carried along by the lower conveyor chain 74 as will be described presently. One of the unformed tacos is designated at 210 in FIG. 2. The manner in which it is formed will be described presently. The conveyor belt 194 is driven by the sprocket wheel 92, the sprocket wheel 92 being on the shaft 94.

Figure 4:
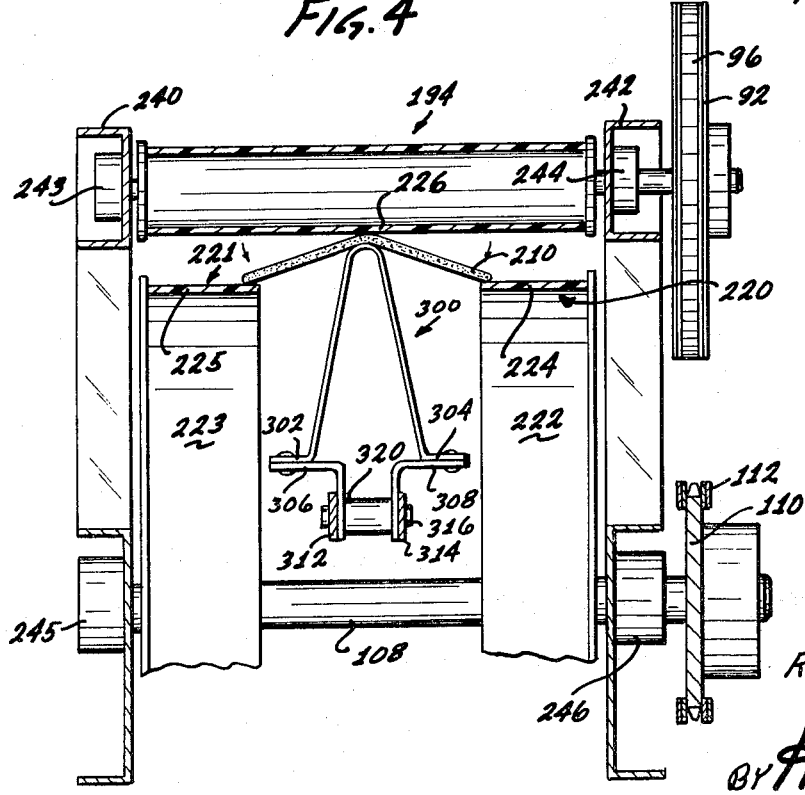
FIG. 4 is a sectional view taken along line 4—4 of FIG. 2.

Numerals 220 and 221 designate a pair of further conveyor belts which pass around large wheels or pulleys 222 and 223 which are on the shaft 108 which shaft is driven through the sprocket chain 112 previously described. The conveyor belts 220 and 221 have upper reaches 224 and 225 that move parallel to the lower reach 226 of conveyor belt 194. The conveyor belts 220 and 221 extend into the drying unit 10 their lower reaches passing over a roller 230 on a shaft 232 journalled in the frame structure 186. Shaft 108 is driven from sprocket wheel 106 on shaft 104 on which is the sprocket wheel 118. FIG. 4 shows frame support members 240 and 242 within the tank and shaft bearings 243, 244, 245 and 246.

From the foregoing it will be observed that the tacos as shown at 210 are fed off the conveyor 46 into a position between the lower reach 226 of conveyor belt 194 and the upper reaches 224 and 225 of conveyor belts 220 and 221 so that they are carried into a position to be formed by the apparatus as now will be described. See FIGS. 2, 3, 4 and 5.

Figure 5:
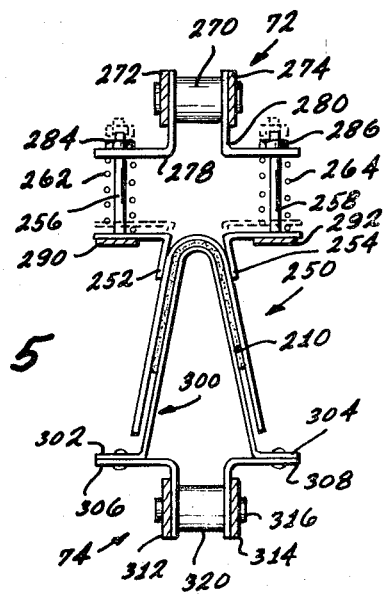
FIG. 5 is a sectional view taken along line 5—5 of FIG. 2.

The upper conveyor chain 72 carries spaced forming members having a configuration as best seen in FIG. 5, FIG. 5 being a cross-sectional view taken along line 5—5 of FIG. 2. Numeral 250 designates one of the upper forming members. The member is of inverted V-shape as may be seen and may be made of suitable metal such as for example, aluminum. The member 250 is suitably attached to side brackets 252 and 254 which are slidable on stems 256 and 258 respectively. Surrounding the stem 256 is a coil spring 262, and surrounding the stem 258 is a coil spring 264. Numeral 270 designates one of the transverse members of the link chain 72 and numerals 272 and 274 designate spaced side links having the transverse member 270 extending between them in pivotal relationship. The link chain as described carries the right angle bracket members 278 and 280 through which the upper ends of the stems 256 and 258, extend there being nuts on the ends of these stems as designated at 284 and 286. As may be seen, in the position of FIG. 5 the forming member 250 extends downwardly from the lower reach of the link chain 72 which in FIGS. 1 and 2 moves to the right.

Numerals 290 and 292 designate guide or cam rails having a configuration as may be seen in FIG. 2. Thus as may be seen, from FIG. 2 as the sprocket wheel 100 rotates in a counterclockwise direction the upper forming members such as the member 250 will be brought down into a position wherein the extending bracket members 252 and 254 engage the cam rails 290 and 292 to bring the forming member 250 into a position wherein its bight portion or fold portion is parallel to the lower forming members as will be described presently.

Referring to FIG. 5, numeral 300 designates one of the lower forming members. As will be seen it is also of inverted V-shaped configuration having a size to be able to telescope with respect to the forming member 250. At the ends of the legs of the forming member 300 it has extending parts 302 and 304 which are secured to right angular bracket members 306 and 308. These bracket members have a shape as may be seen in FIG. 2 and they are pivotally attached between the ends of chain link members as designated at 312 and 314 by way of transverse members 320 on pivots such as shown at 316 passing through the transverse spacing members.

Thus, from the foregoing, it will be observed that a dried tortilla as shown at 210 will be carried downwardly between the lower reach 226 of conveyor belt 194 and upper reaches 224 and 225 of conveyor belt 220 and delivered into a position over one of the lower forming members 300 as may be seen in FIGS. 2 and 4 where it will assume a shape as shown in FIG. 4. As the forming member 300 is now moved along by the conveyor chain 74, an upper forming member 250 will come down over the lower forming member 300 as illustrated in FIG. 2 so that the two forming members become telescoped one inside the other with the taco formed or folded about a diameter as illustrated in cross-section in FIG. 5. The upper chain conveyor will exert sufficient pressure on the upper forming members to effectively form the tacos, the springs 262 and 264 allowing some give and limiting the pressure that is exerted by the upper forming members. The upper and lower forming members then move to the right as the lower reach of the upper conveyor chain 72 and the upper reach of the lower conveyor chain 74 move along down toward the deeper end of the vat of cooking oil in which the tacos are now being fully cooked in their formed shape.

It will be observed from FIG. 1A that the lower chain conveyor 74 is longer or of greater extent than the upper chain conveyor 72. At the end of the upper chain conveyor the upper forming members 250 of course, move away from the lower forming members leaving the formed taco shells 210 continuing to rest on the lower forming members. In FIG. 1A numeral 330 designates oil recirculating nozzles positioned as shown to discharge a stream of oil in an upward direction around and over the forming member 300 as it passes the nozzle so that the formed taco 210 is freed from the forming member and is allowed to float upwardly in the cooking oil as shown. The cooked and formed taco is then carried out of the vat of cooking oil as will be described. Any suitable pump may be used for recirculating.

Numeral 332 designates a transverse shaft having on it a roller 334 over which passes a conveyor belt 336. This conveyor belt passes over another roller above the level of oil in the tank 68 designated at 340, this roller being on the shaft 342. Conveyor belt 336 passes over a further roller 344 on a shaft 346 the conveyor belt then extending back down into the oil in the tank. The conveyor belt 336 carries hinged conveyor members as designated at 350 which are attached to the conveyor belt on hinge pins such as shown at 352 so as to allow these members to collapse or rotate in one direction such as illustrated at 350a, in FIG. 1A. Thus these members are allowed to collapse inwardly as they pass into the tank adjacent to a baffle member 356. The members 350 move adjacent to a curved baffle member 360 in the tank 68 and adjacent to another baffle member 362 which is adjacent to the end of the upper chain conveyor 72. Outside of the tank is a further conveyor 366 operating over a roller 368 driven by suitable means. The formed and cooked tacos are carried up out of the vat by the conveyor belt 336 as shown and are then dropped onto the final conveyor 366 to be conveyed to the point of packaging or otherwise.

From the foregoing those skilled in the art will readily understand the operation of the machine which has been explained in connection with the construction of its various component parts. Briefly, however, the operation may be summarized as follows. The partially cooked tacos are dried in the dryer unit 10 as they are carried back and forth along the conveyors therein. The tacos are then carried into the cooking and forming mechanism by way of the conveyors 194 and 220 as described. They are delivered onto the individual lower forming units 30 and then carried into a position between telescoping upper and lower forming units 250 and 300 as described. Thus, while held formed they are carried through the cooking oil in the vat to be cooked, to the lower deeper end of the tank. At this end the upper conveyor moves the upper forming units away from telescoped relationship with the lower forming units. The oil jets then free the formed and cooked tacos from the lower forming units and they float upwardly through the cooking oil to be carried out of the tank by way of a conveyor as described and delivered to a final conveyor.

From the foregoing those skilled in the art will understand and appreciate the nature of the construction and operation of the invention and the manner in which it realizes all of the objects and advantages as set forth in the foregoing as well as the many additional advantages that are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. An apparatus for forming and cooking taco shells and the like comprising: a pair of inclined conveyor means, each having a plurality of V-shaped forming members thereon, the V-shaped members on one conveyor means having the top of the V attached to the conveyor and the bottom of the V directed away from the conveyor, the V-shaped forming members on the other conveyor means having the bottom of the V attached to the conveyor and the open top of the V extending away from the conveyor; means for telescoping V-shaped members of one conveyor means over corresponding V-shaped members of the other conveyor means, the V-shaped members of one conveyor being fixedly secured thereto and the V-shaped members on the other conveyor being resiliently mounted thereon for yieldable movement away from said one conveyor, said means for telescoping comprising reaches of the conveyor means positioned relatively to each other whereby V-shaped members in an inverted position telescope downwardly over V-shaped members in an inverted position on the other conveyor means; means for positioning unformed taco shells between corresponding telescoping V-shaped members to be held and formed therebetween by placing the unformed taco shells on inverted V-shaped members on said one conveyor means; and means for simultaneously moving said telescoping V-shaped members and tacos therebetween through a bath of cooking oil.

2. An apparatus as in claim 1 wherein said means for positioning unformed taco shells between telescoping forming members to be engaged and formed thereby is arranged to place an unformed taco shell on one V-shaped member before its corresponding V-shaped member is telescoped thereover.

3. An apparatus as in claim 1 including means to discharge a formed taco adjacent the position at which the telescoping forming members separate from each other.

4. An apparatus as in claim 3 wherein said discharge means comprises mechanism for causing the tacos to separate from a forming member and to be floated upwardly in the cooking oil.

5. An apparatus for forming and cooking taco shells and the like, comprising: a pair of conveyor means, each having a plurality of V-shaped forming members thereon; means for telescoping the V-shaped members of one conveyor over corresponding V-shaped members of the other conveyor; means for positioning unformed taco shells between corresponding V-shaped members to be held and formed therebetween; and means for simultaneously moving said telescoped V-shaped members and tacos therebetween through a bath of cooking oil, said unformed taco shell positioning means comprising an upper conveyor belt and a pair of laterally spaced lower conveyor belts, the lower conveyor belts having upper reaches positioned parallel to and spaced from a lower reach of the upper conveyor belt, the conveyor carrying the forming members including a reach having a position between said spaced upper reaches whereby a taco shell could be delivered onto the forming members of said conveyor reach.

* * * * *